April 24, 1951
R. BATAILLE
2,550,519
RADIO TRANSMITTER-RECEIVER STATION WITH
AUTOMATIC FREQUENCY CONTROL
Filed Aug. 2, 1947
5 Sheets-Sheet 1
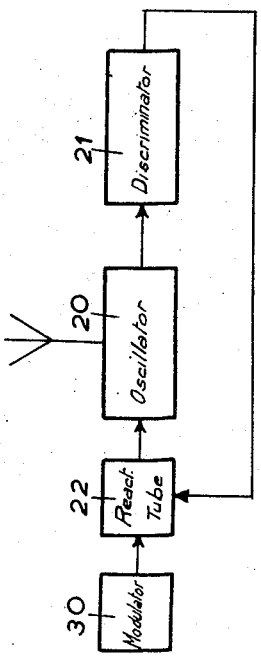
Fig. 2
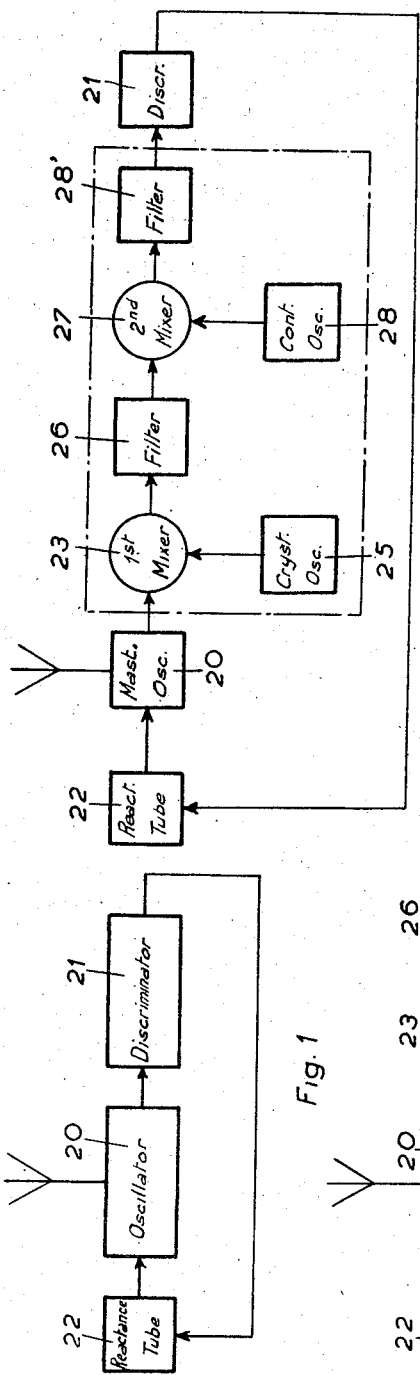
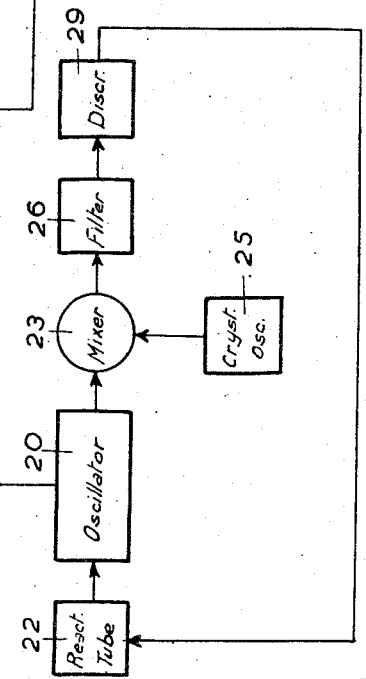
Fig. 4
Fig. 1
Fig. 3
INVENTOR:
ROGER BATAILLE
BY:
Haseltine, Lake & Co.
AGENTS

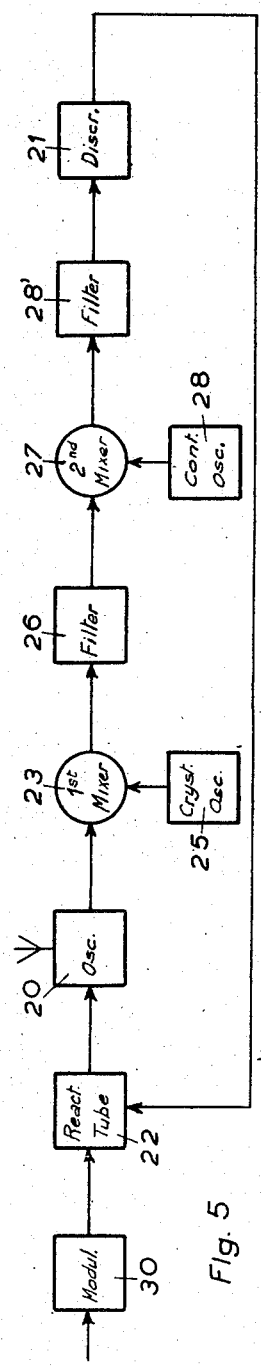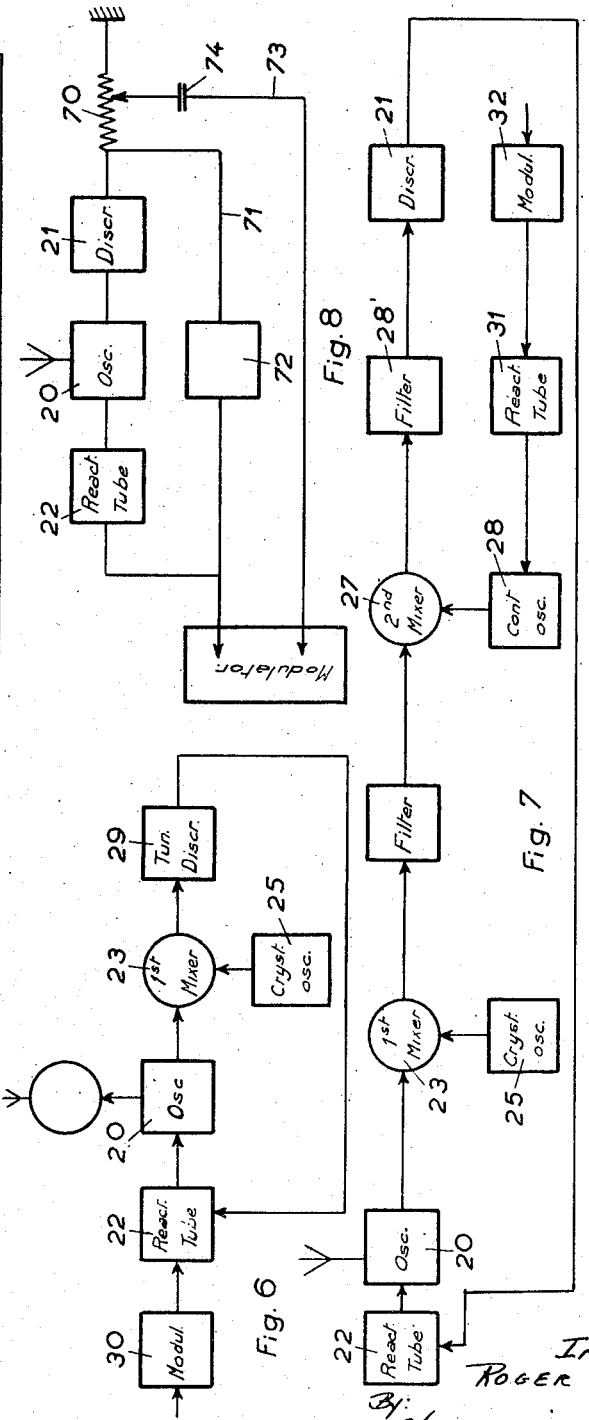

April 24, 1951     R. BATAILLE     2,550,519
RADIO TRANSMITTER-RECEIVER STATION WITH
AUTOMATIC FREQUENCY CONTROL
Filed Aug. 2, 1947           5 Sheets-Sheet 3
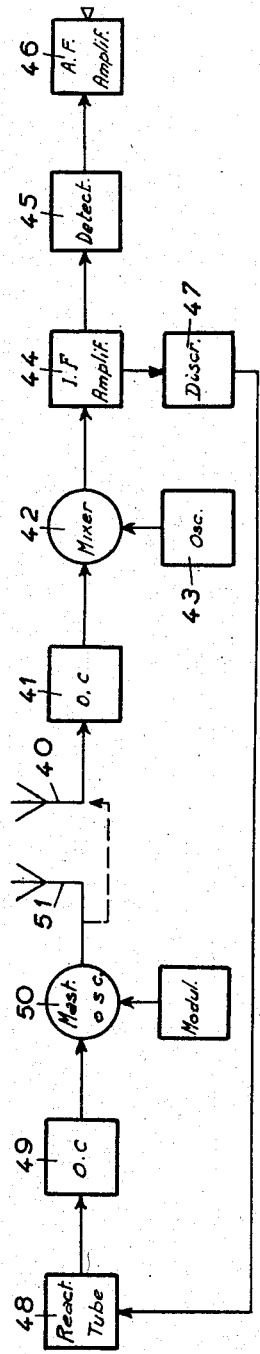
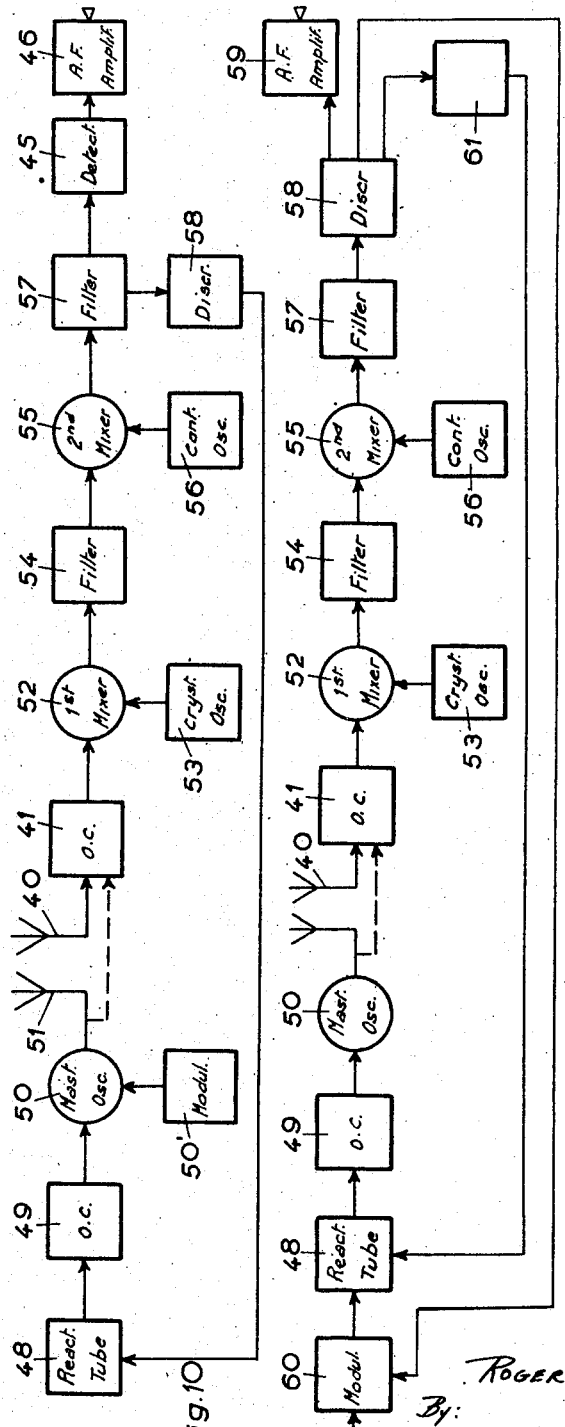
INVENTOR:
ROGER BATAILLE
By:
Haseltine Lake & Co.
AGENTS

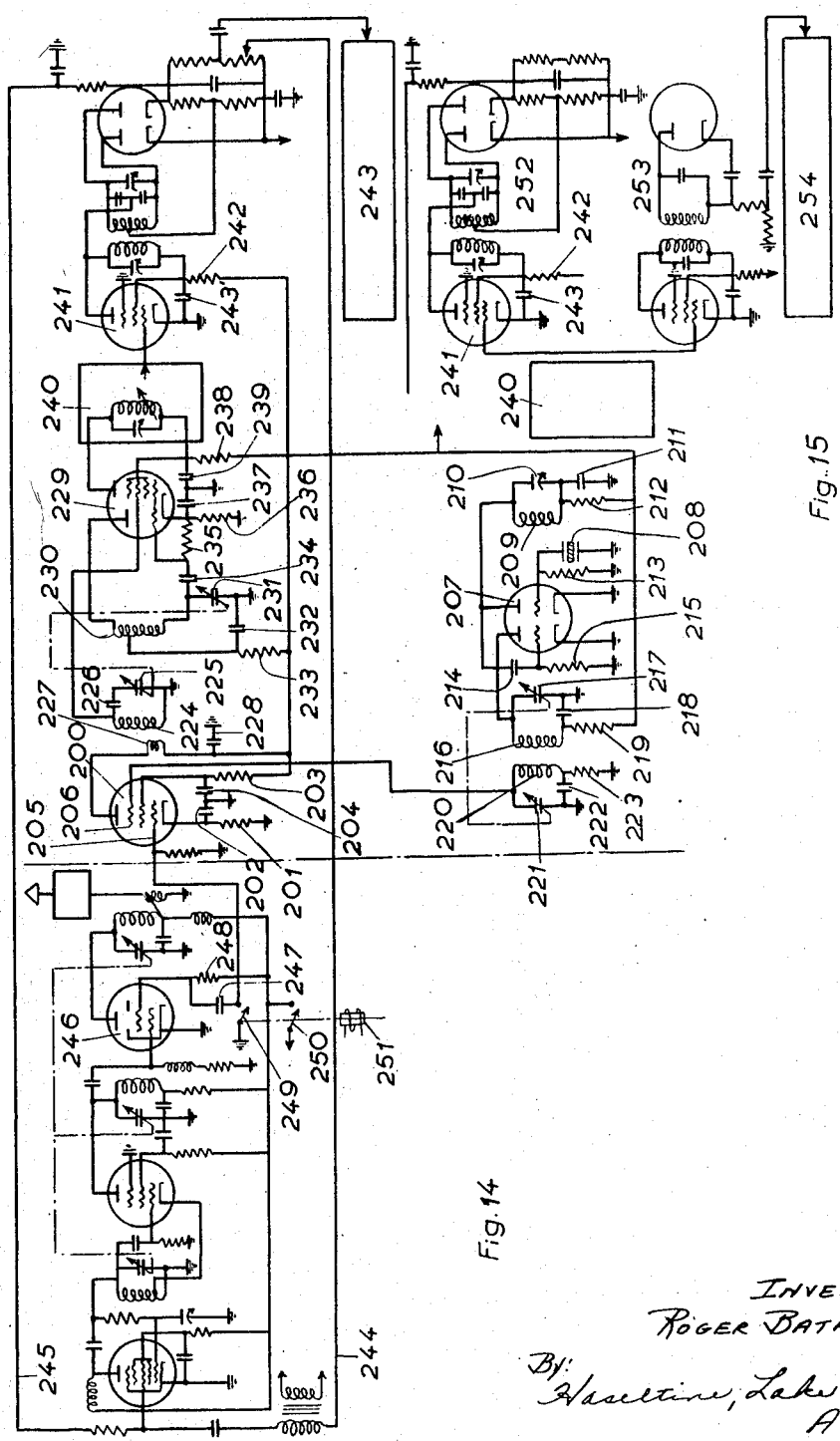

Patented Apr. 24, 1951

2,550,519

UNITED STATES PATENT OFFICE 2,550,519

RADIO TRANSMITTER-RECEIVER STATION WITH AUTOMATIC FREQUENCY CONTROL

Roger Bataille, Montmorency, France, assignor to Societe Francaise des Telecommunications, Neuilly-sur-Seine, France, a corporation of France Application August 2, 1947, Serial No. 765,763
In France June 12, 1946

Section 1, Public Law 690, August 8, 1946
Patent expires June 12, 1966

12 Claims. (Cl. 250—13)

The objects of the invention are:

A. A process for stabilizing the frequency of a generator of electric oscillations, characterized in that the frequency of the generated oscillations is controlled by means of a reactance tube subjected to the potential difference which may be taken from the output of a discriminator acted upon by the generated oscillations and adjusted on the frequency to be stabilized.

B. A generator of electric oscillations of stable frequency characterized in that it comprises an oscillator, a discriminator acted upon by the generated oscillations and adjusted on the desired frequency, a reactance tube subjected to the potential difference which may be taken from the output of the discriminator and forming a part of the oscillating circuit of the oscillator.

C. An embodiment of such a generator, characterized by any of the following features taken separately or in combination:

(1). The discriminator is preceded by a circuit similar to the one described in the patent applications of Bataille and Honorat, Serial Nos. 704,074 and 37,696.

(2) The harmonic selector used in the local oscillator of this circuit comprises a variable condenser having predetermined adjustment positions corresponding to the harmonics.

D. A modification of this generator according to which the discriminator is adjustable in tuning-frequency in order that for stabilizing any frequency of a wide continuous band, it is sufficient to use a local oscillator controlled by piezoelectric means and giving, by mixing with the incident oscillations, oscillations of intermediate frequency within the range of possible adjustment positions of the discriminator.

E. As a new industrial product, a discriminator having an adjustable operating frequency.

F. An F. M. transmitter characterized by any of the following features, taken separately or in combination:

(3) The carrier frequency is stabilized according to process A as mentioned above.

(4) The frequency modulation is applied to the reactance tube which is used for the stabilization of the carrier frequency.

(5) According to a modification, the frequency modulation is applied to the continually varying local oscillator, so as to bring the oscillations acting upon the discriminator at the medium frequency.

(6) The adjustment of the frequency swing is obtained from the potential difference taken from the output of the discriminator.

(7) The application circuit of this potential difference has no time-constant.

(8) On the contrary, the circuit for the application of the potential difference taken from the discriminator in view of the carrier frequency stabilization has a time-constant.

G. A transmitting and receiving radio-set, characterized by any of the following features, taken separately or in combination:

(9) The receiving devices are used for the adjustment of the frequency of the transmitter, the potential difference obtained at the output of the discriminator forming part of the receiver being used for controlling the operation of a reactance tube forming part of the transmitter.

(10) The tuning devices of the receiver are at a more stable frequency than the tuning device of the transmitter and are used for the stabilization of the frequency of the transmitter according to the process A mentioned above.

(11) The same aerial is used for the transmission and the reception.

H. A radio-electric network comprising a central station and a plurality of transmitting-receiving stations according to G as above.

The following description is given as an example with reference to the accompanying drawings, in which:

Fig. 1 is an elementary diagram of a generator with stabilized frequency;

Fig. 2 is a diagram of such a generator capable of transmitting within a continuous frequency band;

Fig. 3 is a diagram similar to Fig. 2 showing a modification;

Fig. 4 is an elementary diagram of a F. M. transmitter the carrier frequency of which is stabilized according to the invention;

Fig. 5 is a diagram similar to Fig. 4 showing a transmitter capable of radiating within a continuous band of frequencies;

Fig. 6 is a diagram similar to Fig. 5 showing a modification;

Fig. 7 is a diagram similar to Fig. 5 showing a modification of the means used to obtain the frequency modulation;

Fig. 8 is a diagram relating to the automatic limitation of the frequency swing of a frequency modulated transmission;

Fig. 9 is an elementary diagram of a transmitting-receiving station according to the invention;

Fig. 10 is a similar diagram showing a transmitting-receiving station capable of operating within a continuous band of frequencies;

Fig. 11 is a similar diagram of the transmitter-receiver with frequency modulation;

Fig. 14 is a diagram of a transmitting-receiving station adapted for the frequency modulation;

Fig. 15 is a similar diagram of a transmitting-receiving station adapted for the amplitude modulation.

Figures 12, 13:
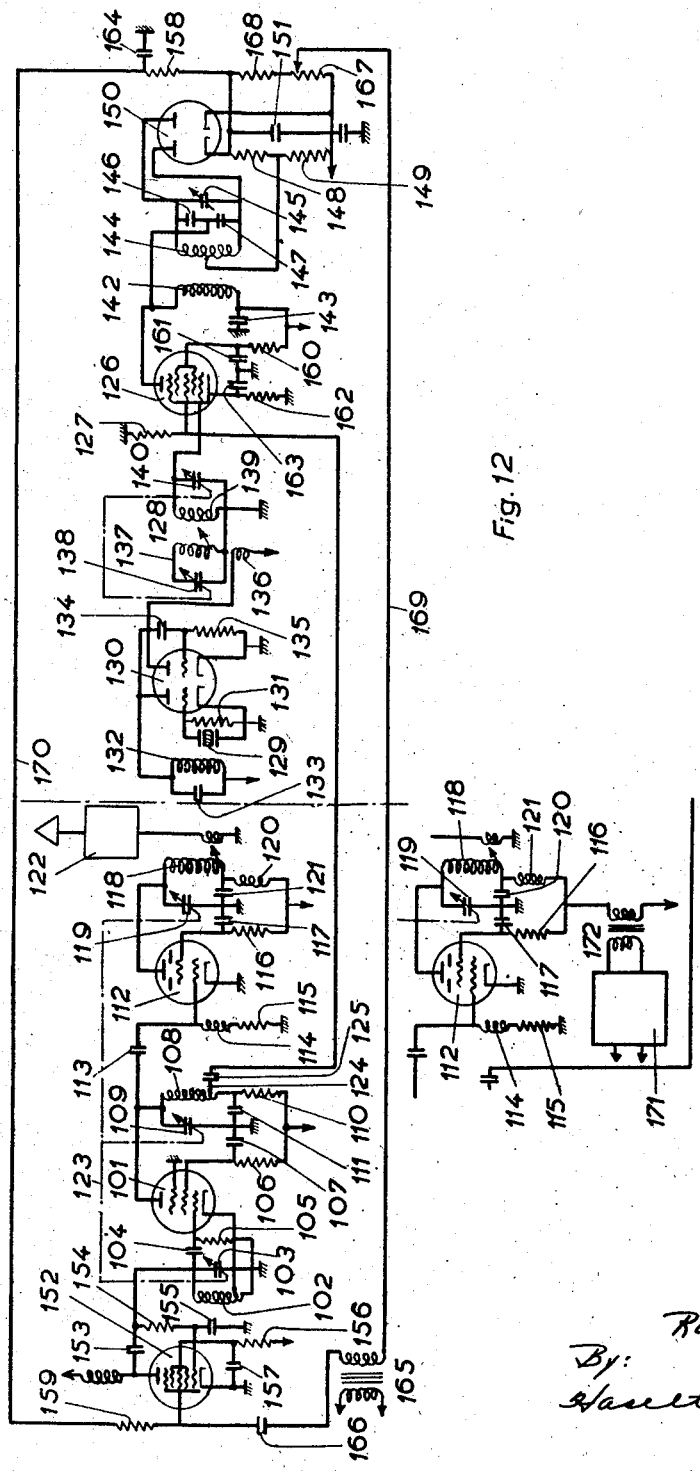
Fig. 12 is a more detailed diagram of a F. M. transmitter having its frequency stabilized according to the invention.
Fig. 13 is a diagram of its adaptation to the amplitude modulation.

Fig. 1 is theoretical diagram of a transmitter with a stabilized frequency. A generator of oscillations 20 is set to radiate on a determined frequency. A part of the oscillations which it transmits are applied to a discriminator 21 adjusted on said frequency and the tuning circuit of which is more stable than the one which determines the frequency of the oscillations generated by the generator 20. Following discriminator 21 is connected a reactance tube device 22, which controls the frequency of the generator of oscillations 20.

If this latter generates oscillations the frequency of which corresponds to the value of adjustment, there is no potential difference at the output of the discriminator 21, and the reactance tube device 22 does not act to modify the frequency of the oscillations generated by the generator.

If, on the contrary, the frequency of the oscillations transmitted by generator 20 varies, for instance due to an insufficient stability of the frequency of the oscillating circuit of said generator, the discriminator 21, acted upon by the oscillations the frequency of which is different from the frequency at which it is adjusted, shows at its output a difference of potential. This difference of potential is positive or negative according to whether the frequency of the oscillations which acts upon the discriminator is higher or lower than the adjustment frequency of the latter. Under the action of this difference of potential the reactance tube device 22 acts in a manner tending to bring the frequency of generator 20 back to the value corresponding to its adjustment.

Other things being equal, the frequency stability of generator 20 is so much better ensured when a determined difference of potential obtained at the output terminals of discriminator 21 corresponds in the generator to a greater variation of frequency due to the intervention of the reactance tube device 22.

Fig. 2 is a diagram of a transmitting device according to the invention adapted to generate oscillations at different frequencies, for instance at any frequency of a continuous band of frequencies.

A part of the oscillations transmitted by generator 20 act upon a first frequency changing tube 23. This tube is acted upon simultaneously by the oscillations fed from an oscillating device 23 stabilized by piezo-electric means. Oscillator 25 is capable of transmitting oscillations at a number of predetermined frequencies. The selected frequency of the oscillations generated by oscillator 25 is such that the frequency of the resulting oscillations from the mixing device 23—after having passed through filtering device 26, which eliminates the component oscillations—is constantly comprised within a determined frequency interval, theoretically narrower than the interval of the band of the frequencies liable to be transmitted by generator 20.

To that effect, for instance, oscillator 25 is controlled by piezo-electric means and is capable of generating oscillations the frequency of which is equal to the resonance-frequency of the crystal or to one of the harmonics thereof. The classification number of the harmonic is chosen in such a way that the frequency of the resultant oscillations or intermediate frequency is included within the chosen interval.

The resultant oscillations act upon a second frequency-changing device 27, simultaneously acted upon by the oscillations generated by a local oscillator 28, the frequency of which oscillations may vary in a continuous manner. The adjustment of the oscillator 28 is such that the frequency of the resultant oscillations, from a filtering device 28, has a constant value whatever may be the frequency of the oscillations transmitted by the generator 20, when the frequencies of the oscillations transmitted by this generator and the oscillators 25 and 28 correspond to the adjustment. The frequencies of the oscillations generated by the oscillator 28, which are lower than the intermediate frequencies, are essentially lower than the frequencies that generator 20 may generate.

This combination of the devices 23, 25, 26, 27, 28 is a circuit already described in the patent applications of Bataille and Honorat, Serial Nos. 704,074 and 37,696.

The oscillations from the filtering device 28 act upon discriminator 21 adjusted on the fixed frequency defined above.

The operation of this apparatus is similar to the one described above. The frequency of the oscillations generated by the oscillator 25 has a substantially perfect stability due to its control by a piezo-electric crystal. The oscillations generated by the continuous varying oscillator 28 have a frequency stability much higher than those generated by generator 20, due to the low value of this frequency. The stability of the circuit of discriminator 21 is still higher than the one of the device 28, because it has a frequency still lower than that of this device. The stability of the whole of the stabilizing device, which is so much the better when the sum in absolute value of the drifts of devices 25, 28, 21 is smaller, is comparable to the stability of a piezo-electric crystal. As soon as, for any reason, the frequency of the circuit with continuous frequency variation controlling generator 20 varies, the frequency of the oscillations from the filtering device 28' becomes different from the frequency at which discriminator 21 is adjusted. It then appears, at the output terminals of discriminator 21, a potential difference, the sign of which is determined by the sense of the variation of the frequency of the oscillations produced by generator 20, and the reactance tube device 22 tends to bring this frequency back to the adjustment value.

The frequencies of the oscillations generated by devices 25 and 28 are higher than the tuning frequency of discriminator 21, so that they cannot affect either directly or through their harmonics the operation of said discriminator. This advantage is especially important for the oscillations produced by device 28, the frequency of which may vary in a continuous manner.

Fig. 3 is a schema of a simplified modification. According to this modification, the oscillations fed from the filtering device 26 are directly applied to a discriminator 29, the tuning-circuit of which has a frequency adjustable in such a way that this frequency is constantly equal to the frequency of the oscillations from the filtering device 26, when the generator 20 produces oscillations of a frequency corresponding to this adjustment.

If, for instance, generator 20 is capable of producing oscillations at any frequency ranging between five and twenty megacycles, generator 25 may be adjusted between four and eighteen megacycles by choosing the suitable harmonic comprised between the 4th and 18th harmonic of a crystal the resonance frequency of which is one megacycle, so that the discriminator is adjustable between one and two megacycles.

The operation of this modified embodiment is similar to the one described above.

The method according to the invention finds a particular interesting use in the transmission of F. M. oscillations.

For such a transmission, it is in effect necessary to dispose of an oscillator, the carrier frequency of which is especially stable. Up to now, it has been used to that effect an oscillator controlled by a piezo-electric crystal. However it is not possible to vary the frequency of such an oscillator directly correspondingly to a modulation. According to the methods of F. M. transmission in present use the phase of the oscillations controlled by piezo-electric means is varied in a manner corresponding to the modulation and the frequency modulation is obtained by multiplying this phase variation. It is necessary to use to that effect several multipliers and the devices applying these methods are very intricate.

According to the invention, on the contrary, the frequency modulation may be obtained directly by the oscillator thanks to the fact that this latter, though stable in frequency, has no piezo-electric crystal.

The object of the invention is therefore a F. M. transmitting device characterized in that it is stabilized in frequency by the method described above, the low frequency modulating current being applied to the oscillator and the frequency modulation being obtained directly without having to pass through the intermediary of a phase modulation.

Further according to the invention, the reactance tube device used for stabilizing the frequency of the generator is also used for the frequency modulation of the oscillations generated by the latter.

The schema of such a transmitting device generating F. M. oscillations is shown in Fig. 4. The generator of oscillations 20 is a generator of the usual type the frequency of which is determined by an oscillating circuit. This frequency is stabilized as it has been indicated above with reference to Fig. 1—by a discriminating device 21 having a frequency stability higher than the stability of the oscillating circuit included in generator 20, and which is followed by a reactance tube device 22, which controls the frequency of the generator 20 in order to stabilize it. In this embodiment, the reactance tube device 22 is moreover fed by the modulation low frequency voltage from a device 30.

Fig. 5 is a schema of a F. M. transmitting device adapted to provide transmissions, the carrier frequency of which has any value within a continuous band of frequencies. This device is derived from the transmitting device with stabilized frequency described above with reference to Fig. 2 and the modulating low frequency current fed from device 30 is applied to reactance tube device 22.

Similarly, the F. M. oscillation transmitting device shown in Fig. 6 is directly derived from the transmitting device stabilized in frequency described above with reference to Fig. 3.

According to an alternative embodiment of the invention the low frequency modulating current is applied not directly to the reactance tube device, but to a local oscillator forming part of the stabilizing system.

Fig. 7 shows schematically such a modification. The stabilized frequency transmitter is of the type described above with reference to Fig. 2. The L. F. modulating current fed from a device 32 is applied to a reactance tube device 31 controlling the frequency of the oscillations generated by the local oscillator 28 having a continuous variation of frequency. The oscillations from the filtering device 29 are modulated in frequency and cause at the output of the discriminating device 21 a L. F. modulating current which, through the reactance tube device 22, ensures the frequency modulation of the oscillations produced by generator 20.

On the other hand, it is known that the coexistence of transmitting stations located close to each other leads, to limit the frequency zone scanned by a determined station. In the case of a F. M. transmitter, the carrier frequency of which may vary, it is necessary to provide special devices to limit the zone scanned consequently to the frequency modulation, that is the frequency swing.

The invention makes it possible, in a F. M. transmitting station of the type described above, to limit the frequency swing to the desired value, whatever may be the carrier frequency of the transmitter and this without having to add special devices which would constitute a complication of manufacture.

According to the invention, the potential difference that may be obtained at the output of the discriminator forming part of the stabilizing device is used to control the A. F. modulating current.

Fig. 8 is a schema showing a circuit adapted to limit the frequency swing. The potential difference taken from the output of discriminator 21, across resistor 76, is fully utilized as mentioned above for stabilizing the frequency of generator 20. To that effect, said potential difference is applied through a circuit 71 to the reactance tube device 22. Said circuit comprises a device 72 having a high time-constant so that the variation of frequency resulting from the modulation has no influence on the control of the stabilization of the carrier frequency. The amplification coefficient inherent in this circuit is high in order to insure an efficient stabilization.

A second circuit 73, drawing only a part of the difference of potential existing across discriminator 21 and comprising a condenser 74, controls the value of the A. F. modulating current. This circuit may have an amplification coefficient smaller than the preceding one. If the frequency swing has a tendency to increase, for instance when passing from a determined carrier frequency to a higher carrier frequency, the modulated difference of potential existing at the output of discriminator 21 increases and, through circuit 73, reduces the A. F. modulating current, thereby bringing back this latter to the value which corresponds to an acceptable frequency swing.

Said modulated potential difference has no effect on the control of the carrier frequency due to the presence of the time-constant device 72.

The invention has also for its object a transmitting-receiving system remarkable in that when it receives a transmission of a given wave length, it is capable of transmitting in turn, without adjustment, that is an automatic manner, on the same wave length as that of the reception. This system is characterized in that the combination of means ensuring the change of frequency of the receiving station is used for the stabilisation of the frequency of the transmitting station.

Such a system may for instance be used in a network comprising a central station and a certain number of exterior transmitting-receiving stations according to the invention. The reception of a transmission from the central station by these different exterior stations tunes automatically said exterior stations on the wave length of the transmission, so that at the central station the answers of the exterior stations are received without having to search on the wave length of the initial emission.

Furthermore, the stability of the frequency adjustment of the transmission is controlled by the receiving device, in such a way that when this latter is very stable, for instance due to the use of local oscillators with piezo-electric crystal or of continuous variation but with low frequency, the stability of the frequency of the transmitter is ensured without having to resort for this latter to special devices such as a piezo-electric crystal oscillator.

Fig. 9 is a diagram of such a transmitting-receiving system. The incident oscillations picked up by aerial 40 and, for instance, modulated in amplitude, are applied through an input circuit 41 to a frequency changing tube 42, which is simultaneously fed with oscillations generated by a local oscillator 43 having a continuous variation of frequency, and the adjustment of which is such that the resultant oscillations passing through a circuit 44, are the intermediate frequency oscillations. The latter are led towards a detecting device 45, followed by a low-frequency amplifier 46.

The transmitter part comprises a master oscillator 50, of which the oscillating circuit 49 is associated with a reactance tube device 48. Oscillator 30, the oscillations of which are modulated by the intermediary of a modulator 50', transmits through aerial 51.

When the receiver is tuned on a given wave length, for instance for the reception of a determined transmission, if the transmitter is set into operation, and is tuned approximately on said frequency, for instance by synchronized setting of the various tuning elements of the transmitter and of the receiver, it transmits then automatically exactly on said wave length due to the fact that a part of the oscillations emitted by the transmitter reaches the receivers. If they are of the same frequency as the frequency on which the receiver is tuned, there is no potential difference at the output terminals of discriminator 47. If, on the contrary, this frequency is different, such a difference of potential appears which, through the intermediary of the reactance tube device 48, brings the frequency of oscillator 50 back to the desired value. If the oscillating circuit of the local oscillator 43 is more stable than the oscillating circuit 49, the stabilization of the frequency of the transmitter is also automatically obtained.

Fig. 10 is a schema of a transmitting-receiving set ensuring the reception within a continuous band of frequencies as wide as desired, and also the transmission within a continuous band of frequencies, the frequency of the transmission being automatically adjusted on the frequency of the reception. Furthermore, the frequency stability of the transmission may be ensured without having to resort to a piezo-electric crystal for the oscillator of the transmitter.

The receiver is of the type described in the patent applications mentioned above. It comprises a first frequency changing tube 52, fed, on the one hand with the incident oscillations and on the other hand by an harmonic of suitable classification order of the oscillations generated by a piezo-electric crystal forming part of a local oscillator 53. The oscillations of intermediate frequency obtained after filtering at the output of a circuit 54, are applied to a second frequency changing tube 55, simultaneously fed with the oscillations generated by a second local generator 56, having a continuous variation of frequency, and a natural low frequency. The resultant oscillations obtained after filtering at the output of a circuit 57 are the oscillations of intermediate frequency. They are detected by a device 45 and amplified by a device 46.

When the receiver is tuned on a given station, the transmitter—which is constituted as described above—transmits automatically on said frequency, thanks to its control by the circuit issued from the discriminator 58, if its tuning means are in the neighborhood of the position which corresponds to said frequency.

The stabilization of the transmission frequency is ensured, due to the fact that the local oscillator 53 is controlled by piezo-electric means and that the local oscillator 56 is a low-frequency oscillator.

Fig. 11 is a schema of a transmitting-receiving set operating by frequency modulation. At the receiving end, the discriminator 58 makes the modulation appear and the low-frequency current is amplified in an amplifier 59. At the transmitting end, the modulation is directly applied to the reactance tube 48, by a device 60. The adjustment of the frequency swing is obtained as described above. A device with time constant is provided between the discriminator 59 and the reactance tube 48.

In certain cases, the reactance tube device may be replaced by a variable condenser, the position of the movable part of which depends upon the potential difference taken from the output of the discriminator.

Now will be described, with reference to Fig. 12, an embodiment of a transmitter with stabilized frequency, designed according to the schema of Fig. 6. The tube 101 is oscillating in its lower part (see the drawing) and amplifying, eventually doubling, in its upper part. It may for instance cover a band of 15 to 30 megacycles, this numerical indication being obviously given without any character of limitation and merely to illustrate the explanation. The doubling of the frequency avoids the reactions of the amplified high frequency oscillations on the oscillating circuit constituted by the inductance coil 102 and the variable condenser 103, which may vary the tuning from 7.5 to 15 megacycles. The oscillator is connected as a cathodyne. Its control grid is operated through a coupling condenser 104 and a grid-leak resistor 105 is provided. The screen voltage is obtained through the screen resistor 106 and decoupling condenser 107. To the anode is connected as a rejector circuit the double frequency resonating circuit, constituted by inductance-coil 108 and variable condenser 109, the high voltage feeding being ensured through the decoupling resistor 110 and the decoupling condenser 111. The high frequency voltage, amplified and doubled, is applied to the power tube 112, through the intermediary of the coupling condenser 113. The choke coil 114 and the grid-leak resistor 115 ensures a suitable bias of tube 112. The screen voltage is obtained through a screen resistor 116 and a coupling condenser 117. The plate circuit is constituted by self-inductance 118 and variable condenser 119. The high voltage is applied through the choke-coil 120 and is decoupled by passage through condenser 121. The voltage applied to the aerial is adjusted by means of a tuning-device 122.

The variable condensers 103, 109 and 119 are mechanically ganged by means of a connection.

The oscillations of which the frequency is to be controlled are taken from the oscillating circuit 108—109, without affecting the operation of the oscillator—thanks to a tap 124 and these oscillations are applied through a coupling capacity 125 upon one of the grids of a frequency changing tube 126. The biasing of this grid is insured by a grid-leak resistor 127.

Conjointly to the oscillations to be controlled are applied on the second grid of tube 126 the oscillations from a harmonic-selector 128 and generated by a piezo-electric crystal oscillator. The quartz 129 controls the frequency of an oscillator constituted by the half of a double tube 130 the left-hand triode of which acts as an oscillator. The quartz 129 is connected between the grid and the ground with a grid-leak resistor 131. To the anode circuit is connected the oscillating circuit constituted by self-inductance 132 and condenser 133, the control of the frequency being ensured by the quartz 129. This latter has for instance a resonance frequency of 1000 kilocycles. The oscillations at 1000 kilocycles are applied through the condenser 134 to the grid of the second triode section of tube 130 which operates according to class C, the grid-bias being obtained by the grid-leak resistor 135. This element acts as an harmonic-selector. The voltage applied on the grid is substantially high, so as to provide extremely short plate-current impulses. These impulses of plate-current are applied by coupling through self-inductance 136 to an oscillating circuit constituted by self-inductance 137 and the variable condenser 138, coupled in turn at critical coupling, with the oscillating circuit constituted by inductance-coil 139 and variable condenser 140. Across this latter oscillating circuit there is obtained an harmonic selected among the harmonics of the resonance frequency of the quartz by ganged condensers 138 and 140.

This harmonic selecting device is constituted by an oscillating circuit the variable condenser of which has its movable part capable of assuming predetermined positions, thanks, for instance, to an indexing or step-setting device, and replaces advantageously the stud devices comprising multiple capacities previously used.

In the embodiment described and shown, the harmonic selector is constituted by the combination of two oscillating circuits, of which the variable condensers are mechanically connected. In the numerical example chosen, it is possible to obtain at the output of the device 138 the oscillations of 14, 15, 16 ... 28 megacycles, and the condenser scales is marked with figures 15, 16 etc. ... 29.

In the plate-circuit of the mixing-tube 126, is connected the resonant-circuit of the discriminating device, which is adjusted in frequency between 1 and 2 megacycles. This discriminating device comprises a primary inductance 142, fed with high voltage decoupled by condenser 143. This inductance is suitably coupled to the secondary oscillating circuit constituted by inductance 144, the coupling of which with inductance 142 is electro-magnetic.

The adjustment of the variable condenser 145 allows to tune the oscillating circuit between 1 and 2 megacycles. The primary voltage is applied to the mid-point of the secondary oscillating circuit through coupling condensers 146 and 147. The mid-point of inductance coil 144 is connected to the mid-point of the set constituted by resistances 148 and 149 connected between the two cathodes of a duo-diode tube 150. The potential of each end of the oscillating circuit is applied to the two anodes of this tube. A decoupling condenser 151 allows for the passage of the high frequency component applied to the diode. The resistor 160 is provided for feeding the screen of the tube 126 while the condenser 161 is a decoupling capacity for said screen. Resistor 162 is the bias resistor of the cathode of this tube while the condenser 163 is a decoupling capacity of this cathode.

The control of condenser 145 is graduated from 0 to 1000 kilocycles, its adjustment varying the resonance frequency of the oscillating circuit from 1000 to 2000 kilocycles.

A tube 152, which will be called the reactance tube, is associated with the oscillating circuit 102—103 of the oscillator. The high frequency voltage of this oscillator is applied to the anode of tube 152 through condenser 153 and simultaneously to the control-grid through resistor 154 and adjustable condenser 155. The ratio between the resistance of resistor 154 and the capacity of condenser 155 is such that the voltage applied to the grid is phase-shifted by 180° with respect to the voltage applied to the anode. The screen voltage of this tube, used as a frequency changer, is applied through resistor 156 and is decoupled by condenser 157. Tube 152 acts as an impedance in parallel with self-inductance 102. This impedance is variable according to the dynamic slope of tube 152, controlled by a second grid. This second control grid is connected to a negative potential through the resistors 148 and 149 of the discriminator and through resistors 158 and 159. The circuit of connection of the discriminator to the reactance tube, comprising the resistors 158 and 159, presents a time-constant thanks to condenser 164 associated with resistor 158.

If it is desired to control a determined frequency, for instance of 18.450 kilocycles, this frequency is indicated on the frequency stabilizing device, the control of condensers 138 and 140 being indexed on "18" (corresponding to 17 megacycles applied on the first control-grid of tube 126) and the control of condenser 145 is indexed on "450" (corresponding to a tuning of the discriminator on 1.450 kilocycles).

Thus it may be seen, that, in order that the frequency coming out of tube 126 be the frequency of adjustment of condenser 145, it is necessary that the frequency from the transmitter be:

17.000+1.450=18.450

If this is the case, the output voltage at the discriminator terminals constituted by resistors 148 and 149 is nil. The potential difference applied to the control-grid of tube 152 results then solely from the bias potential through resistors 148—149, 158—159. If the frequency of the transmitter tends to depart from the adjusting value, a potential difference, positive or negative according to the sense of the deviation is developed across resistors 148 and 149, which causes either an increase or a drop of the voltage on this control-grid, i. e. an increase or a decrease of the self-inductance of the oscillating circuit of the oscillator which tends to maintain the frequency to the initial value.

The frequency modulation of the generated oscillations is obtained by varying the potential of the control-grid of the tube 152 at the modulating frequency. The low-frequency modulating current is applied to this grid through the intermediary of a transformer 165 and of a coupling condenser 166.

The keeping up of the frequency swing at the suitable value is obtained automatically thanks to the opposed low-frequency voltage drawn by the voltage-divider 167 connected in series with the resistor 168. The circuit 169 for the utilization of this voltage has no time-constant and has a control-coefficient which may be lower than the one of circuit 170 controlling the carrier frequency.

Fig. 13 shows the adaptation of such a transmitter to the transmission of oscillations modulated in amplitude. The low frequency modulating voltage after having passed through an amplifier 171 and through a transformer 172 is applied in superposition to the supply voltage on the anode and on the screen of tube 112.

Fig. 14 is a schema of embodiment of a transmitting-receiving set constructed according to the circuit shown in Fig. 11.

The transmitter is designed exactly like the one shown in Fig. 12.

The receiver comprises a first frequency-changer tube 200 the cathode of which is biased by a bias resistor 201; 202 is a decoupling condenser of the cathode; 203 a screen-feeding resistor and 204 is a decoupling screen-condenser. Tube 200 receives the incident frequency on its lower grid 205 and the first local frequency on a control-grid 206. This frequency is one of the harmonics selected by an harmonic-selecting oscillator controlled by a piezo-electric crystal. This selecting oscillator is exactly similar to the one described with reference to Fig. 12. It comprises a double tube 207, the first oscillating element of which is controlled by a quartz 208 having for instance a resonance frequency of 2 megacycles. Here too this numerical indication is given merely as an illustrative example. The oscillating circuit connected in the plate circuit is constituted by an inductance-coil 209 and a condenser 210; 211 shows a decoupling condenser of the plate; 212 a decoupling resistor of the plate and 213 a grid leak resistor. To this second triode-section of tube 207, which acts as a selector, are associated a coupling condenser 214, and a grid-leak resistor 215. The first oscillating circuit is constituted by inductance-coil 16 and the variable condenser 217. It comprises a decoupling condenser 218 of the anode-voltage. 219 is a decoupling resistor of the anode-voltage. The second oscillating circuit is constituted by an inductance-coil 220 and a variable condenser 221. It comprises a decoupling-condenser 222; 223 is a bias resistor of the grid 206 of tube 200. The variable condensers 217 and 221 are ganged. They are of the indexing or step-setting type and are capable, for instance, of tuning the oscillating circuits successively on 34, 36, etc. . . . 46 megacycles. The oscillations having these frequencies are applied to tube 200 conjointly with the incident signal, the frequency of which may be comprised, for instance, between 37 and 51 megacycles.

The resultant oscillations, from tube 200, have a frequency comprised between 3 and 5 megacycles and are thus within a band the width of which is 2 megacycles. These resulting frequencies are selected by the oscillating circuit constituted by inductance-coil and variable condenser 225, the fixed condenser 226 acting as a padding-condenser. The coupling is ensured by self-inductance 227. The discoupling of the high voltage is ensured by condenser 228.

The resultant oscillations of intermediate frequency are applied to the control-grid of a tube 229 of the triode-hexode type. On the injector grid of this tube are applied the second local oscillations furnished by the triode section of this tube, the frequency of which may vary in a continuous manner, for instance, from 2.5 mc., to 3.5 mc., the oscillating circuit being constituted by self-inductance 230 and the variable condenser 231; 232 is a decoupling condenser and 233 a decoupling resistor of the plate. 234 is a decoupling condenser of the grid and 235 a grid leak resistor. The biasing-resistor of the cathode is shown at 236, the decoupling condenser of the cathode at 237, the screen and plate feeding resistor at 238, and the screen and plate decoupling condenser at 239. The variable condensers 225 and 231 are keyed on the same shaft and are aligned. The resultant oscillations at the output of the hexode have a fixed frequency or mean frequency. The frequency of the reception is defined by the adjustment of condensers 217 and 221, graduated from 37 to 49, megacycle by megacycle, and defined by the adjustment of condensers 225 and 231, graduated in a continuous manner from 0 to 2000 kilocycles.

The intermediate frequency oscillations are amplified in an I. F. amplifier 240 and then applied to a tube 241 used as a clipper, the resistor 242 and the condenser 243' being provided for the decoupling of the screen supply and of the plate voltage. At the output of the clipper is a discriminating device, the design of which is similar to the one described with reference to Fig. 12, except that the primary and the secondary are tuned on a fixed frequency, which is the intermediate frequency, while in the preceding embodiment, the tuning could be made on a variable frequency.

If the oscillations received are modulated in frequency, the discriminating device gives at its output low frequency oscillations which reproduce the modulation and which are then applied to a low-frequency amplifier 243.

The transmitting device is exactly similar to the one described with reference to Fig. 12. When the station operates as a transmitting station, the receiving part previously described operates as a device for stabilizing the frequency of the transmitting station, which may be automatically the frequency of the recetving station.

The adjustment of the frequency swing is made then by the circuit 244 and the stabilization of the carrier frequency by the circuit 245, as already seen.

The invention provides the use of the same circuit for the tuning in reception than the one utilized for the transmission. At the receiving station, use is made of the internal capacitance of tube 246 between the anode and the screen grid, the high voltage being then not applied. 247 is a decoupling screen condenser shunted by a screen-resistor 248. The high frequency voltage is taken ahead of the oscillating circuit.

For the transmission, the contacts 249 and 250 are closed, for instance through a relay 251. The high voltage feeding is thus obtained and the decoupling screen-condenser is connected to the ground. In this case, the voltage applied to the grid of the receiver is sufficiently low so as not to block the reception. The shifting from the transmitting position to the receiving position takes place without affecting the oscillating circuit.

Fig. 15 shows the adaptation of the device for receiving oscillations modulated in amplitude. At the output of the I. F. amplifier 240, the oscillations are led into two channels, one of which contains a discriminator 252 while the other contains a detecting device 253. This latter is used for the reception of the oscillations and is followed by a low-frequency amplifier 254. The discriminator 252 is used for the transmission to ensure, on the one hand, the frequency equality of the transmission and reception, and, on the other hand, to stabilize the frequency of the transmission.

I claim:

1. Apparatus for transmitting frequency modulated electric oscillations comprising an oscillation generator, means for tuning said generator to any frequency of a continuous frequency band, a mixer following said generator fed with the oscillations provided by said generator, means for applying to said mixer oscillations of which the frequency is controlled by a crystal, means for selecting the frequency of last said oscillations from a finite plurality of frequencies so that the frequency of the resulting oscillations from the output of said mixer be included within a frequency interval materially narrower than the frequency band of the oscillations to be transmitted, a second mixer following the first mixer and fed with said resulting oscillations, means for applying further to said second mixer oscillations of which the frequency is selected in a continuous frequency interval which is not larger than the frequency interval of the first resulting oscillations, so that the oscillations resulting from the second mixer be at a frequency having a fixed value, following said second mixer a discriminator of which the operation frequency is adjusted to said fixed value, a reactance tube controlled by the potential difference taken from the output of said discriminator, means for controlling the frequency of said oscillation generator from said reactance tube, means for producing audio-frequency modulating oscillations, means for applying also to said reactance tube the said audio-frequency modulating oscillations.

2. Apparatus for transmitting frequency modulated oscillations comprising a generator providing carrier oscillations, tuning means for adjusting the frequency of said carrier oscillations to any value within a continuous frequency band, a mixer following said generator and fed with said carrier oscillations, means for applying furthermore to said mixer control oscillations of which the frequency is adjusted piezo-electrically, so that the resulting oscillations from the mixer have a frequency the value of which is included within a frequency interval materially narrower than said tuning band, a discriminator following said mixer, means for applying said resulting oscillations as input of said discriminator, means for continuously adjusting the discriminating frequency of said discriminator, within a range substantially equal to said interval, a reactance tube controlled by the potential difference taken from the output of the discriminator, means for controlling the frequency of the said generator from said reactance tube, means for producing audio-frequency modulating oscillations, means for supplying also said reactance tube with the said audio-frequency modulating oscillations.

3. An apparatus for transmitting frequency modulated electric oscillations comprising an oscillation generator, means in said generator for adjusting the carrier frequency of the oscillations to a well-defined value, a discriminator acted upon by the oscillations fed from said generator, means for adjusting the operation frequency of the discriminator to the value of the carrier frequency of the oscillations to be transmitted, said means having essentially a higher degree of frequency stability than the adjusting means in said oscillation generator, a reactance tube for controlling the frequency of the oscillations generated by said oscillation generator, means for controlling said reactance tube by the potential difference taken from the output of the discriminator, a device producing audio-frequency modulating oscillations, means for also controlling said reactance tube by said audio-frequency oscillations, means for adjusting the amplitude of the audio-frequency modulating oscillations by the potential difference taken from the output of said discriminator.

4. In an apparatus for transmitting frequency modulated electric oscillations according to claim 3 a high time-constant amplifying circuit comprised in the means for controlling the reactance tube by the difference of potential at the discriminator output and an amplifying circuit having a time-constant lower than said first amplifying circuit comprised in the means for adjusting the amplitude of the audio-frequency modulating oscillations by the said potential difference.

5. In an apparatus for transmitting radio oscillations at any selected nominal frequency within a continuous frequency band: a generator of carrier oscillations, means for adjusting the frequency of the output oscillations from said generator at any of a continuous band of frequency values, means for extracting part of said carrier oscillations, a discriminator having a discriminatory frequency, with which corresponds a zero output control voltage substantially smaller than any frequency of said frequency band, between said generator and said discriminator a mixer fed firstly with said extracted oscillations, means for secondly feeding to said mixer oscillations substantially more stable as to frequency than the output oscillations from said generator, comprising: a first piezo-electrically controlled oscillator, means for extracting from said oscillator oscillations having a selected frequency in a succession of frequency values uniformly distant from each other by an amount substantially less than the width of said continuous frequency band, a second oscillator having a low natural frequency adapted for continuous frequency variation, means for extracting from said second oscillator oscillations having a selected frequency from a continuous frequency interval substantially equal in width to said uniform distance, a second mixer fed firstly with said selected frequency oscillations supplied by said first oscillator and secondly with said selected frequency oscillations supplied by said second oscillator, a filter fed with the output oscillations from said second mixer, and means for adjusting the passing frequency of said filter in response to the frequency of the resulting mixed output oscillations from said second mixer, means for continuously adjusting the frequency of said stable frequency oscillations at a value equal to the difference between said nominal frequency and said discriminatory frequency, means for applying the output oscillations from said first mixer to the input of said discriminator, and means for applying the output voltage from the discriminator to a reactance tube controlling the frequency of the oscillation generator.

6. Apparatus for transmitting radio oscillations at any desired frequency selected from a continuous frequency band, which comprises: means for supplying carrier oscillations, an inductance-capacitance circuit controlling the frequency of said carrier oscillations, means for tuning said circuit on any desired frequency in said continuous frequency band, electronic means to vary the frequency of said carrier oscillations on either side of the frequency value as controlled by said inductance and capacitance circuit, a first mixer fed with said carrier oscillations, a first oscillator controlled by piezo-electric means, means for extracting from said oscillator oscillations having a selected one of a sequence of uniformly displaced frequencies, the amount of displacement therebetween being substantially less than the width of said frequency band, a first filter following said first mixer fed with the mixed frequencies and adapted to pass only one of the resulting mixed frequencies, a second mixer fed firstly with the output oscillations from said first filter, a second oscillator having a low natural frequency and continuously variable in frequency, means for extracting from said second oscillator oscillations having any desired frequency value in a continuous frequency interval substantially equal in width to the said displacement, and fed with the output oscillations from said second mixer, a second filter passing only one of the resulting output frequencies from said second mixer, a discriminator fed with the output oscillations from said second filter and the discriminatory frequency of which is equal to the difference between the frequency to be transmitted and the sum total of the said frequencies extracted from said first and second oscillators, and means for applying the output voltage from said discriminator to said electronic means controlling the frequency of said generator of carrier oscillations.

7. In apparatus as in claim 6, means for adjusting the passing frequency of said second filter to the difference between the frequencies of the oscillations fed to said second mixer.

8. In apparatus as in claim 6, a piezo-electrical crystal controlling the frequency of the oscillations supplied from said first oscillator and the fundamental frequency of which is greater than said discriminatory frequency, and means for adjusting the frequency of the oscillations of said second oscillator over a continuous interval of frequencies, the lower limit of which is also greater than said discriminatory frequency.

9. Apparatus as in claim 6 for the transmission of frequency-modulated oscillations, which comprises an audio-frequency modulator feeding said second modulator.

10. In an apparatus for transmitting and receiving radio-oscillations on any desired frequency of a continuous frequency band, a superheterodyne receiver comprising means for picking up incident oscillations in any one of said continuous band of frequencies, a first mixer fed with the picked up oscillations, a first local oscillator adapted to supply over a frequency band substantially equal in width to said first-mentioned frequency band, a discontinuous sequence of uniformly displaced frequencies, means for feeding additionally said first mixer with one of said sequence of frequencies, a filter fed with the output oscillations from said mixer and passing only a frequency resulting from the mixing of said oscillations, a second mixer fed firstly with the oscillations passing through said filter, a second local oscillator of low natural frequency supplying oscillations the frequency of which may have any value over a continuous frequency interval substantially equal to the displacement between two adjacent frequencies of said sequence, a second filter fed with the output oscillations from said second mixer and passing only one of the resulting mixer frequencies, a discriminator fed with the oscillations passing said second filter, and a transmitter comprising a pilot oscillator, means for radiating the energy piloted by said oscillations, means for varying the frequency of said pilot oscillations, means for varying the frequency of said pilot oscillator over said continuous frequency band, and means for automatically controlling the frequency of the pilot oscillator under the control of said discriminator.

11. In a transmitting-receiving system according to claim 10, an audio-frequency modulator, means for controlling said reactance tube by the oscillations fed from said modulator, means for adjusting the value of the modulating current by the potential difference taken from the output of the discriminator.

12. An apparatus for transmitting electric oscillations adapted to the transmission of frequency modulated oscillations comprising a generator of electric oscillations of continuously variable frequency, means for tuning said generator to any frequency of a continuous frequency band, a mixer fed with said oscillations following said generator, means for applying to said mixer control oscillations of which the frequency is controlled by a crystal, means for modifying the frequency of said control oscillations from a finite sequence of frequencies extending over a range substantially equal to said band, means for selecting as control oscillations those frequencies of said sequence which differ from the frequency to be transmitted by an interval materially narrower than the said frequency band, a second mixer fed with the resulting oscillations from said first mixer, means for applying to said second mixer second control oscillations having a frequency continuously variable over said interval means for adjusting the frequency of said second control oscillations to a value differing by a constant amount from the frequency of the resulting oscillations from said first mixer, fed with the output oscillations from said second mixer a discriminator of which the operation frequency is said constant value, a reactance tube controlled by the potential difference taken from the output of said discriminator, means for controlling the frequency of said oscillation generator from said reactance tube, a second reactance tube, means for varying from said second reactance tube, the frequency of the oscillations fed to the second mixer, and means for controlling said second reactance tube by audio-frequency modulating oscillations.

ROGER BATAILLE.

REFERENCES CITED

The following references are of record in the file of this patent:

UNITED STATES PATENTS

| Number | Name | Date |
|---|---|---|
| 1,035,958 | Girardeau | Aug. 20, 1912 |
| 1,788,533 | Morrison | Jan. 13, 1931 |
| 2,262,932 | Guanella | Nov. 18, 1941 |
| 2,270,023 | Ramsay et al. | Jan. 13, 1942 |
| 2,317,547 | McRae | Apr. 27, 1943 |
| 2,333,719 | Herold | Nov. 9, 1043 |
| 2,379,395 | Ziegler et al. | June 26, 1945 |
| 2,403,011 | McClain | July 2, 1946 |
| 2,406,125 | Ziegler et al. | Aug. 20, 1946 |
| 2,407,863 | Ziegler | Sept. 17, 1946 |
| 2,408,791 | Magnuski | Oct. 8, 1946 |
| 2,408,826 | Vogel | Oct. 8, 1946 |
| 2,419,527 | Bartelink | Apr. 29, 1947 |
| 2,419,593 | Robinson | Apr. 29, 1947 |
| 2,462,294 | Thompson | Feb. 22, 1949 |

FOREIGN PATENTS

| Number | Country | Date |
|---|---|---|
| 551,472 | Great Britain | Feb. 24, 1943 |